US009222530B2

(12) United States Patent
Duraiswamy et al.

(10) Patent No.: US 9,222,530 B2
(45) Date of Patent: Dec. 29, 2015

(54) DRIVE TRAIN CONTROL ARRANGEMENT

(75) Inventors: Shivkumar Duraiswamy, Portland, OR (US); Ferdinand Waizenegger, Stuttgart (DE); Uwe Mueller, Stuttgart (DE); George Myers, Vancouver, WA (US); Daniel Nullmeier, Waiblingen (DE)

(73) Assignee: Daimler AG, Stuttgart (DE)

( * ) Notice: Subject to any disclaimer, the term of this patent is extended or adjusted under 35 U.S.C. 154(b) by 555 days.

(21) Appl. No.: 13/582,059

(22) PCT Filed: Feb. 19, 2011

(86) PCT No.: PCT/EP2011/000807
§ 371 (c)(1),
(2), (4) Date: Nov. 16, 2012

(87) PCT Pub. No.: WO2011/107222
PCT Pub. Date: Sep. 9, 2011

(65) Prior Publication Data
US 2013/0131942 A1    May 23, 2013

Related U.S. Application Data

(63) Continuation-in-part of application No. 12/660,692, filed on Mar. 2, 2010, now abandoned.

(51) Int. Cl.
*F16D 43/284* (2006.01)
*B60K 17/36* (2006.01)
(Continued)

(52) U.S. Cl.
CPC .............. *F16D 43/284* (2013.01); *B60K 17/36* (2013.01); *B60K 23/08* (2013.01); *F16D 48/0206* (2013.01); *B60K 17/02* (2013.01); *B60Y 2200/14* (2013.01); *F16D 2048/0278* (2013.01); *F16D 2500/3056* (2013.01); *F16D 2500/31* (2013.01);
(Continued)

(58) Field of Classification Search
None
See application file for complete search history.

(56) References Cited

U.S. PATENT DOCUMENTS

2010/0248888 A1*    9/2010    Hamperl et al. .............. 475/221

FOREIGN PATENT DOCUMENTS

DE    10 2006 045 007 A1    2/2008
DE    10 2008 015 224 A1    3/2009
(Continued)

OTHER PUBLICATIONS

International Search Report dated Jul. 4, 2011 (three (3) pages).
Form PCT/ISA/237 (four (4) pages).

*Primary Examiner* — Mussa A Shaawat
(74) *Attorney, Agent, or Firm* — Crowell & Moring LLP

(57) ABSTRACT

A drive train control arrangement for a motor vehicle drive train includes a main drive train, a first drive axle permanently driven by the main drive train, an auxiliary drive train and a second drive axle coupleable to the main drive train via the auxiliary drive train, which has a first clutch unit and a second clutch unit connected downstream in the power train of the first clutch unit for connecting the second drive axle to the main drive train, and a control unit, which in at least one operating mode that closes the at least one second clutch unit of the auxiliary drive train to shift into a standby operating mode when a defined operating condition is present, and with the standby operating mode activated, closes the first clutch unit of the auxiliary drive train to connect the coupleable second drive axle depending on at least one parameter.

14 Claims, 2 Drawing Sheets

(51) Int. Cl.
 *B60K 23/08* (2006.01)
 *F16D 48/02* (2006.01)
 *B60K 17/02* (2006.01)

(52) U.S. Cl.
 CPC ............. *F16D 2500/31426* (2013.01); *F16D 2500/31433* (2013.01); *F16D 2500/7041* (2013.01); *F16D 2500/70406* (2013.01)

(56) References Cited

FOREIGN PATENT DOCUMENTS

| | | |
|---|---|---|
| JP | 63-116932 A | 5/1988 |
| JP | 63-137026 A | 6/1988 |
| JP | 2-200528 A | 8/1990 |
| JP | 2009-292307 A | 12/2009 |
| WO | WO 2008/019759 A1 | 2/2008 |

* cited by examiner

DRIVE TRAIN CONTROL ARRANGEMENT

BACKGROUND AND SUMMARY OF THE INVENTION

The invention relates to a drive train control arrangement that comprises at least one main drive train, a first drive axle driven permanently by the main drive train, at least one auxiliary drive train and a second drive axle coupleable to the main drive train by the auxiliary drive train, including at least one first clutch unit and at least a second clutch unit connected in the auxiliary drive train downstream of the first clutch unit for connecting the second drive axle to the main drive train, with a control unit, which controls the actuation of the clutches and as a result, the power transferred to the second drive axle.

German Patent Document DE 10 2006 045 007 discloses a motor vehicle drive train comprising a main drive train, a first drive axle permanently driven connected to the main drive train, an auxiliary drive train and a second drive axle coupleable to the main drive train by way of the auxiliary drive train, wherein the auxiliary drive train has a first clutch unit for connecting the second drive axle to the main drive train and a second clutch unit connected downstream in the power train of the first clutch unit.

It is the object of the present invention to provide a drive train control arrangement for a motor vehicle drive train including a main drive train to a first axle and a second drive train to a second axle, automatically actuated for connection of the second drive axle when necessary.

In a drive train control arrangement for a motor vehicle drive train, which comprises at least one main drive train, a first drive axle driven permanently by means of the main drive train, at least one auxiliary drive train and a second drive axle coupleable to the main drive train via the auxiliary drive train, which has a first clutch unit and at least a second clutch unit connected downstream in the power train of the first clutch unit for connecting the second drive axle to the main drive train, and a control unit, which operates in at least one of the following operating modes closes the at least one second clutch unit of the auxiliary drive train to shift into a standby operating mode when a defined operating condition is present, and with the standby operating mode activated, closes the first clutch unit of the auxiliary drive train to connect the coupleable second drive axle depending on at least one parameter and establishes herewith a 6×4 operating mode or, respectively, opens the second clutch unit to shift to the normal operating mode, in which the auxiliary drive train is also disconnected.

The invention is based on a drive train control device for a motor vehicle drive train, which comprises at least one main drive train, a first drive axle driven permanently by means of the main drive train, at least one auxiliary drive train and a second drive axle coupleable to the main drive train by means of the auxiliary drive train, wherein the auxiliary drive train has at least a first clutch unit and at least a second clutch unit connected downstream in the power train of the first clutch unit, with a control unit, which at least shifts a standby operating mode in an operating state when a defined operating condition is present by closing the at least one second clutch unit and, starting from the standby operating mode, connects the coupleable second drive axle depending on at least one parameter by closing the at least one first clutch unit of the auxiliary drive train. A connection of the coupleable second drive axle can thereby be established rapidly. The connection of the second drive axle can be rapidly and better established in response to a need of the second drive axle by a rapid coupling. The connection of the second drive axle can advantageously automatically be performed and controlled by the control unit. An "operating condition" is especially meant to be a condition that has to fulfill a value of at least one parameter to activate something. A "parameter" is a measurable value, which describes an operating state of the motor vehicle drive train. A "standby operating mode" is an operating mode, in which the second clutch unit is closed and the first clutch unit is opened. In the standby operating mode, the motor vehicle drive train is prepared for a connection of the coupleable second drive axle. A "6×4 operating mode" is an operating mode, in which the first and the second clutch units are closed, so the coupleable second drive axle is coupled to the permanently driven first drive axle. "Prepared" means in this case that the second drive axle can be connected by only closing a single clutch unit when necessary.

Furthermore, in the present invention the control unit, starting from the standby operating mode, shifts into a normal operating mode when a further operating condition is present, by opening the at least one second clutch unit. By providing an alternative for the connection of the second drive axle, an adaptation ability of the drive train control device can be increased. A "normal operating mode" is especially meant to be an operating mode in which the first clutch unit and the second clutch unit are opened. In the normal operating mode, the motor vehicle drive train can advantageously be operated in a low loss mode compared to the standby operating mode. A low loss mode means that only the main drive train transfers a torque. In the normal operating mode, a part of the auxiliary drive train is decoupled from a rotary movement. The auxiliary drive train is divided operatively in the normal operating mode, wherein an auxiliary drive train branching off the main drive train, which drives the first drive axle, to drive the second drive axle is disconnected.

Additionally, in the present invention the control unit, starting from the normal operating mode, synchronizes the at least one second clutch unit by intermittently closing the at least one first clutch unit for shifting to the standby operating mode. A safe and comfortable shifting from the normal operating mode to the standby operating mode can be achieved thereby. "Intermittently closing" is especially meant to be that the first clutch unit is only closed for synchronizing the at least one second clutch unit. The duration of the closure is especially dependent on a speed difference across the at least one second clutch unit. The closing state is thereby maintained until either the differential speed lies within a defined differential speed band, or a maximum time span deposited in the control unit has lapsed. The duration thereby varies in a region between zero and the maximum duration. The maximum duration is advantageously between 1 and 10 seconds and particularly advantageously between 1 and 5 seconds.

In an advantageous arrangement, the control unit prevents a shifting of the clutch units during a defined time span, whereby a frequent change between the operating modes can be prevented. A "defined time span" is intended to be a time span, whose value is stored in the control unit. The control unit can thereby be provided to increase the value depending on a traction parameter. The value for the defined time span is preferably between 5 and 60 seconds, advantageously between 5 and 30 seconds, and especially advantageously between 5 and 15 seconds. A "traction parameter" means a parameter which describes how much of the torque present at the drive wheels can be transferred to a road. A surface of a road, as for example a dry (normal) road, can be recognized via the traction parameter.

It is advantageous if the control unit determines the operating condition for shifting the standby operating mode and the operating condition for shifting to the normal operating mode depending on the same parameter. The operating conditions can thereby be defined in a simple manner.

It is further advantageous if the motor vehicle drive train has at least one unpowered axle and the control unit determines the parameter by means of the unpowered axle. An advantageous parameter can thereby be provided in a simple manner. An "unpowered axle" is especially meant to be a permanently unpowered axle. The permanently unpowered axle is advantageously permanently decoupled from the main drive train and the auxiliary drive train, that is, a coupling to the main drive train or to the auxiliary drive train is not possible.

Additionally, in the present invention the operating condition for shifting to the standby operating mode and the operating condition for shifting to the normal operating mode are defined by two different speed limit values. Back and forth shifting from the standby operating mode to the normal operating mode and vice versa which is too frequent, can thereby be prevented in an advantageous manner.

In an advantageous arrangement the 6×4 operating mode is established when the vehicle speed is below a third speed limit value, so it is established at launch of the vehicle and at very low vehicle speeds. The control unit can additionally check whether the engine torque is above an engine torque threshold. Drive tire wear is an exponential function of the longitudinal force on the tire. In 6×4 operating mode there is an even distribution of the torque between the first and the second rear drive axle. Establishing the 6×4 operating mode in the named situations produces even tire wear and helps to improve tire life on the first rear drive axle.

It is especially advantageous if the control and/or regulation unit adapts at least one of the conditions for a change of the operation mode to the traction parameter in at least one operating state. The named conditions can thereby be adapted to an environment and to a road surface.

In an advantageous arrangement the control unit monitors an oil temperature of the axle drive of the second drive axle and closes the first clutch unit when the oil temperature is below a temperature threshold. During extended duration of operation in the normal mode (axle drive (differential) of the second drive axle stands still) and during freezing ambient temperatures, it is possible for a second axle sump oil to transform into a semi-solid state. Subsequent engagement of the second clutches during transition to the standby operation mode might cause a torque spike in the axle. By closing the first clutch unit periodically a drive gearwheel of the second axle drive spins and heats up the sump oil.

In an advantageous arrangement the control unit engages the 6×4 operating mode when engine compression brakes are activated. Tire wear is an exponential function of the longitudinal force on the tire. Engaging the 6×4 operating mode provides even distribution of the negative torque between the first and the second axle drive to produce even tire wear. This helps to improve tire life on the first axle drive.

In an advantageous arrangement, the control unit connects a drive shaft of the main drive train to a drive shaft of the auxiliary drive train in at least one operating state by means of the at least a first clutch unit. The connection of the second drive axle can thereby be realized in a simple manner.

Moreover, in the present invention the auxiliary drive train has at least one axle drive (differential) and the second clutch unit at least two clutches arranged in the power train after the axle drive, and the control and/or regulation unit simultaneously opens the two clutches of the second clutch unit for shifting the normal operating mode. The decoupling of the drive wheels of the second drive axle can thereby be realized in a simple manner by the auxiliary drive train.

The invention will become more readily apparent from the following description of a particular embodiment thereof on the basis of the accompanying drawings.

DETAILED DESCRIPTION OF A PREFERRED EMBODIMENT

Figure 1:
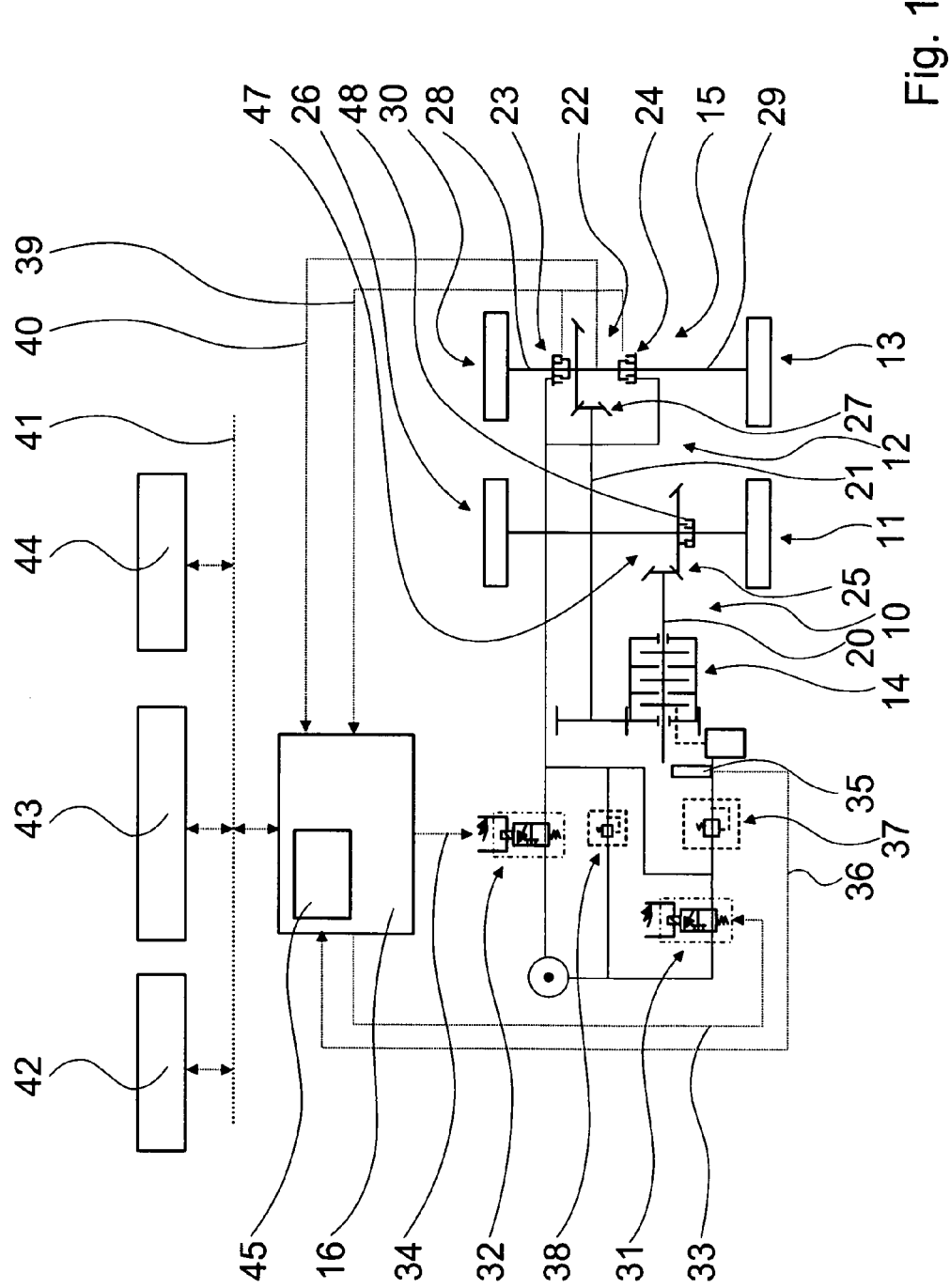
FIG. 1 shows a first motor vehicle drive train with a drive train control arrangement and FIG. 2 a diagram, in which a vehicle speed, a first operating condition and a second operating condition are represented in dependence on time.

FIG. 1 schematically shows a motor vehicle drive train with a drive train control arrangement according to the invention. The motor vehicle drive train is a heavy truck drive train. The motor vehicle drive train has an unpowered axle, not shown, a main drive train 10, an auxiliary drive train 12, a permanently connected first drive axle 11, and a second drive axle 13 which is engageable and disengageable.

The main drive train 10 is permanently connected to the first drive axle 11. The main drive train 10 has a drive shaft 20, a drive gearwheel 25, an axle drive 47 and a differential lock 48. The drive shaft 20 applies a torque to the motor vehicle drive train. The drive gearwheel 25 is driven via the drive shaft 20. The drive gearwheel 25 drives the axle drive 47 of the first drive axle 11. The axle drive 47 forms a differential. The drive shaft 20 is always coupled to the axle drive of the first drive axle 11. The axle drive of the first drive axle 11 drives the drive wheels 26 of the first drive axle 11. The differential lock 48 locks the differential if necessary by connecting the drive wheels 26 to each other in a torque-proof manner. The drive shaft 20 is always coupled to the first drive axle 11 via the drive gearwheel 25.

The auxiliary drive train 12 couples the second drive axle 13 to the main drive train 10 if necessary. The auxiliary drive train 12 drives the second drive axle 13 which can be coupled to the main drive train 10. The auxiliary drive train 12 has a (fixed) drive shaft 21, a drive gearwheel 27, an axle drive 22 (differential) and two drive half shafts 28, 29. The drive gearwheel 27 is driven via the fixed drive shaft 21. The drive gearwheel 27 drives the axle drive 22 of the second drive axle 13. The axle drive 22 forms a differential. The fixed drive shaft 21 is permanently coupled to the axle drive 22 of the second drive axle 13. The axle drive 22 drives the drive wheels 30 of the second drive axle 13 by means of the two drive half shafts 28, 29.

The auxiliary drive train 12 includes a first clutch unit 14 and a second clutch unit 15 for connecting the engageable second drive axle to the main drive train 10 or to the permanent drive connected first drive axle 11. The first clutch unit 14 connects the auxiliary drive train 12 to the main drive train 10. The second clutch unit 15 connects the drive wheels 30 of the second drive axle 13 to the auxiliary drive train 12.

The first clutch unit 14 is connected upstream of the drive gearwheel 25 and of the drive gearwheel 27 in a power train. The first clutch unit 14 is formed as a friction-locking shift clutch. The first clutch unit 14 is formed by means of a slip-enabled multi-disk clutch. It has an actuation chamber for a pressure means. The pressure means is a compressed air operated actuator. An actuation pressure can be built up in the actuation chamber by means of the pressure means an actuator 31. The actuator 31 forms a pneumatic drive. The actuator 31 comprises an electrically actuated 3/2 way valve. The valve is controlled by the control unit 16 using a PWM (pulse width modulation) command to vary the duty cycle of the valve which in turn varies the output pressure to the actuation chamber. The first clutch unit 14 can essentially also be formed as an externally shifted form-fit clutch. The actuator 31 can essentially also form an electromechanical, electromagnetic or a hydraulic drive. Two clutch operating states of the first clutch unit 14 can be adjusted by the actuation pressure.

The first clutch unit 14 is opened completely in a first clutch operating state. The auxiliary drive train 12 is separated from the main drive train 10 in the first clutch operating state of the first clutch unit 14. The drive shaft 20 is separated from the fixed drive shaft 21 in the first clutch operating state. The first clutch unit 14 does not transmit a torque to the fixed drive shaft 21 in the first clutch operating state.

The first clutch unit 14 is completely closed in the second clutch operating state. The first clutch unit 14 connects the drive shaft 20 of the main drive train 10 to the fixed drive shaft 21 of the auxiliary drive train 12 in the second clutch operating state. The auxiliary drive train 12 is connected to the main drive train 10 in the second clutch operating state. The first clutch unit 14 transfers a torque to the fixed drive shaft 21 in the second clutch operating state.

The second clutch unit 15 is connected downstream of the drive gearwheel 27 in the power train. The second clutch unit 15 has two form-locking clutches 23, 24. The second clutch unit 15 is arranged on the second drive axle 13. The two clutches 23, 24 are respectively associated each with one of the drive wheels 30. The second clutch unit 15 separates the auxiliary drive train 12 from the axle drive 22 by a decoupling of the drive wheels 30 by opening the two clutches 23, 24 simultaneously. The second clutch unit 15 divides the second drive axle 13 into the axle drive 22 and into the two drive half shafts 28, 29. The axle drive 22 is permanently coupled to the drive shaft 21. The two drive half shafts 28, 29 can be decoupled from the drive shaft 21 and thus from the axle drive 22. The drive wheels 30 are driven by the drive half shafts 28, 29.

The two clutches 23, 24 are arranged in the power train behind the axle drive 22. They are shiftable dog clutches that is, two form-fitting clutches 23, 24 which comprise a shift collar, not shown in detail, which can be operated by a shift fork, not shown in detail by axial longitudinal displacement. The shift fork is moved via an actuator 32. The actuator 32 is formed as a pneumatic drive. The actuator 32 comprises an electrically actuated 3/2 way valve. The actuator 32 can essentially also form an electromechanical, electromagnetic or a hydraulic drive. Two clutch operating states of the second clutch unit 15 can be adjusted by means of the actuator 32.

The second clutch unit 15 is opened completely in the first clutch operating state. The drive wheels 30 are thereby decoupled from the auxiliary drive train 12. When two clutches 23, 24 are opened completely in the first clutch operating state, the auxiliary drive train 12 is interrupted. The second clutch unit 15 does not transfer a torque from the fixed drive shaft 21 to the drive wheels 30, as the drive half shafts 28, 29 are separated from the axle drive 22.

The second clutch unit 15 is closed completely in the second clutch operating state, so that the second clutch unit 15 transfers a torque from the drive shaft 21 to the drive wheels 30 of the second drive axle 13. The drive half shafts 28, 29 are coupled to the axle drive 22 in the second clutch operating state and the drive wheels 30 are connected to the drive shaft 20.

The motor vehicle drive train can have two additional clutches (not shown) in the first drive axle between the axle drive (differential) and the drive wheels. These additional clutches are of the same type as the second clutch unit at the second drive axle. They work in the same way, too. The clutches are open, when the vehicle is rolling with a disconnected drive train (i.e. Neutral gear in the transmission is engaged). This ensures that the main driveline and the first axle drive (differential) are stationary in these situations and so further enhances the reduction in parasitic losses for maximum fuel economy benefit. When the driver indicates the need for engine power (end of rolling), the driveline is first brought up to speed by the transmission. This allows synchronization of the ring gear and the side shafts before engaging the two additional dog clutches. The two additional dog clutches are actuated using pneumatic valves automatically by the control system.

A drive train control arrangement controls the above-described motor vehicle drive train. The drive train control device has a control unit 16 for the automatic actuation of the first clutch unit 14 and the second clutch unit 15 of the motor vehicle drive train. The control unit 16 communicates with the actuator 31 via an electric line 33, and with the actuator 32 via an electric line 34. The control and regulation unit 16 adjusts the actuation pressure or the clutch operating state of the first clutch unit 14 via the actuator 31, and the clutch operating state of the second clutch unit 15 via the actuator 32.

The drive train control arrangement has a pressure sensor 35 for measuring a pressure in the actuation chamber of the first clutch unit 14 and for closing a servo loop of the actuator 31. The control and regulation unit 16 communicates with the pressure sensor via an electric line 36.

The drive train control arrangement comprises an adjustable pressure control valve 37 for reducing the actuation pressure in the actuation chamber of the first clutch unit 14, and thus for the quick opening of the first clutch unit 14. The pressure control valve 37 vents the first clutch unit 14 when necessary. The pressure control valve 37 is arranged between the actuator 31 and the pressure sensor 35.

The drive train control arrangement has a bypass for bridging the actuator 31 and the actuator 32 or for bridging one of the actuators 31, 32. The bypass directs the pressure means past the actuator 31 or the actuator 32 or past both actuators 31, 32 in at least one operating state. The bypass connects an output side of the actuator 31 or an input of the pressure control valve 37 to an output side of the actuator 32 in a flow-technological manner. The bypass further connects the output of the actuator 31 or the input of the pressure control valve 37 to an input of the actuator 32 in a flow-technological manner. The bypass has a further pressure control valve 38 between the output of the actuator 31 or the input of the pressure control valve and the input of the actuator 32. The pressure control valve 38 controls the bypass flow.

The drive train control device has a sensor system (not shown in detail) for recognizing the clutch operating state of the second clutch unit 15. The sensor system respectively comprises a sensor at the two clutches 23, 24. The control unit 16 communicates with the sensors via an electric line 39.

The drive train control arrangement further comprises a sensor, not shown in detail, for synchronizing the axle drive 22 with the drive half shafts 28, 29. The sensor determines a speed of the axle drive 22. The control unit communicates with the sensor via an electrical line 40.

The control unit 16 is also connected to a CAN bus 41 of a heavy truck comprising the drive train control arrangement and the motor vehicle drive train. The control unit 16 specifically communicates with an engine control unit 42, a transmission control unit 43 and an anti-lock braking control unit 44.

The control unit 16 has a standby operating mode, a normal operating mode and a 6×4 operating mode. In the normal operating mode, the first clutch unit 14 and the second clutch unit 15 are respectively in their first clutch operating state, that is, the first clutch unit 14 and the second clutch unit 15 are opened completely. The drive wheels 30 are thereby decoupled from the auxiliary drive train 12.

In the standby operating mode, the first clutch unit 14 is in the first clutch operating state, and the second clutch unit 15 is in the second clutch operating state, that is, only the two clutches 23, 24 of the second clutch unit 15 are closed. The drive wheels 30 are thereby coupled to the auxiliary drive train 12.

In the 6×4 operating mode the first clutch unit 14 and the second clutch unit 15 are in the second clutch operating state, that is, the first clutch unit 14 and the second clutch unit 15 are closed. The drive wheels 30 are thereby coupled to the main drive train 10.

For connecting the coupleable second drive axle 13 to the permanently driven first drive axle 11, the control unit 16 first shifts into the standby mode when a defined operating condition 17 is present by simultaneously closing the clutches 23, 24 of the second clutch unit 15 of the auxiliary drive train 12. Subsequently it connects, starting from the standby operating mode, the engageable second drive axle 13 to the permanently driven first drive axle 11 in dependence on a parameter 18, when necessary, by closing the first clutch unit 14 of the auxiliary drive train 12 (see FIG. 2).

Alternatively to the connection of the coupleable second drive axle 13, the control unit 16 shifts into the normal operating mode, starting from the standby operating mode, when a further operating condition 19 is present, in that the control unit 16 opens the second clutch unit 15 again. The control unit 16 simultaneously opens the two clutches 23, 24 of the second clutch unit 15 for this.

For shifting into the standby operating mode, starting from the normal operating mode, the control unit 16 intermittently shifts the first clutch unit 14 and synchronizes the second clutch unit 15 or the axle drive 22 with the drive half shafts 28, 29. The control unit 16 ends the synchronization, if a differential speed between the drive half shafts 28, 29 and the drive wheels 30 is within a defined differential speed band or after a maximum period deposited in the control unit 16 is exceeded. The maximum period is three seconds in this embodiment.

The control unit 16 shifts to the standby operating mode below the operating state 17 which standby operating mode remains active below the operating state 19. Above the operating state 19, the control unit 16 shifts to the normal operating mode. The active normal operating mode remains active above the operating state 17.

The control unit 16 determines the operating state 17 for shifting to the standby operating mode and the operating mode 19 for shifting to the normal operating mode in dependence on the same parameter 18. The parameter 18 determines the action of the control unit 16 by means of the unpowered axle. The parameter 18 represents a speed of the heavy truck comprising the drive train control device and the motor vehicle drive train.

The operating state 17 for shifting to the standby operating mode and the operating state 19 for shifting to the normal operating mode are defined by two different speed limit values. The first operating state 17 is formed as a lower speed limit. The second operating state 19 is formed as an upper speed limit.

A defined time span is deposited in the control unit 16 for preventing a frequent change between standby operating mode and normal operating mode. During this defined time span, the control unit 16 prevents the shifting of the clutch units 14, 15, whereby an unnecessary numerous shifting back from the standby operating mode to the normal operating mode and from the normal operating mode to the standby operating mode is prevented. The defined time span is formed as a minimum activation time of the standby operating mode and the normal operating mode. A change from the standby operating mode to the normal operating mode and vice versa is only possible after the expiration of this defined time span. The control unit 16 activates a counter for the defined time span at an activation point of the standby operating mode or the normal operating mode. The defined time span has a duration of 10 seconds in this embodiment.

For the connection of the second drive axle 13 in dependence on the parameter 18, a slip limit value is, for example, deposited in the control unit 16 depending on the parameter. The control unit 16 compares the parameter 18 representing a speed to a speed of the first drive axle 11 determined by means of a sensor system, not shown. With a slip between the unpowered axle and the first drive axle 11, which is larger than the slip limit value, the control unit 16 connects the second drive axle 13 to the first drive axle 11 and thereby connects the second drive axle 13 to the main drive train 10.

The front axle rotates faster than the first drive axle during a turn of the vehicle, and accordingly the slip is calculated based on the speed of non driven second drive axle 13 instead of the front axle speed.

The connection of the second drive axle 13 to the first drive axle 11 however takes place in dependence on several additional parameters. For this, the control unit 16 evaluates drive-dynamic and roadside information such as the drive speed, drive acceleration, engine speed, gas pedal position, road inclination and load state sensed by a sensor system, not shown in detail. The control unit 16 determines, for example, a start, an ascent or an initiation of a positive vehicle acceleration from this information. If the load state of the heavy truck makes it necessary to engage the second drive axle 13, the control unit 16 connects the second drive axle 13 to the permanently driven first drive axle 11.

The control unit 16 determines a traction parameter. The traction parameter classifies the road surface, so it indicates how well a torque is transferred from the drive wheels to a road.

Road surface is classified (Normal, Slippery and Very Slippery) based on the following parameters:

Real-time clutch actuation duty cycle of the first clutch unit 14
   Actuation of the first clutch unit 14 is buffered for certain duration to calculate an average actuation duty cycle. This current actuation duty cycle value is weight-averaged with the previous actuation duty cycle to compute the actuation duty cycle.
   High actuation duty cycle indicates adverse conditions and a very slippery surface. If the actuation duty cycle drops below a low threshold, it is indicative that the driving conditions are moderate and road surface is normal.

Ambient temperature
   Low ambient temperature is also an indication of adverse road conditions.

Windshield wiper state
   Windshield wiper state is buffered for certain duration to calculate an averaged wiper state. Wiper active for certain duration is an indication of a wet and slippery road surface For shifting to the normal operating mode, the control unit 16 adapts the defined time span and the operating conditions 19 to the traction parameter. If the control unit 16 recognizes a slippery road, for example, the second operating condition 19 increases and extends the defined time span.

Figure 2:
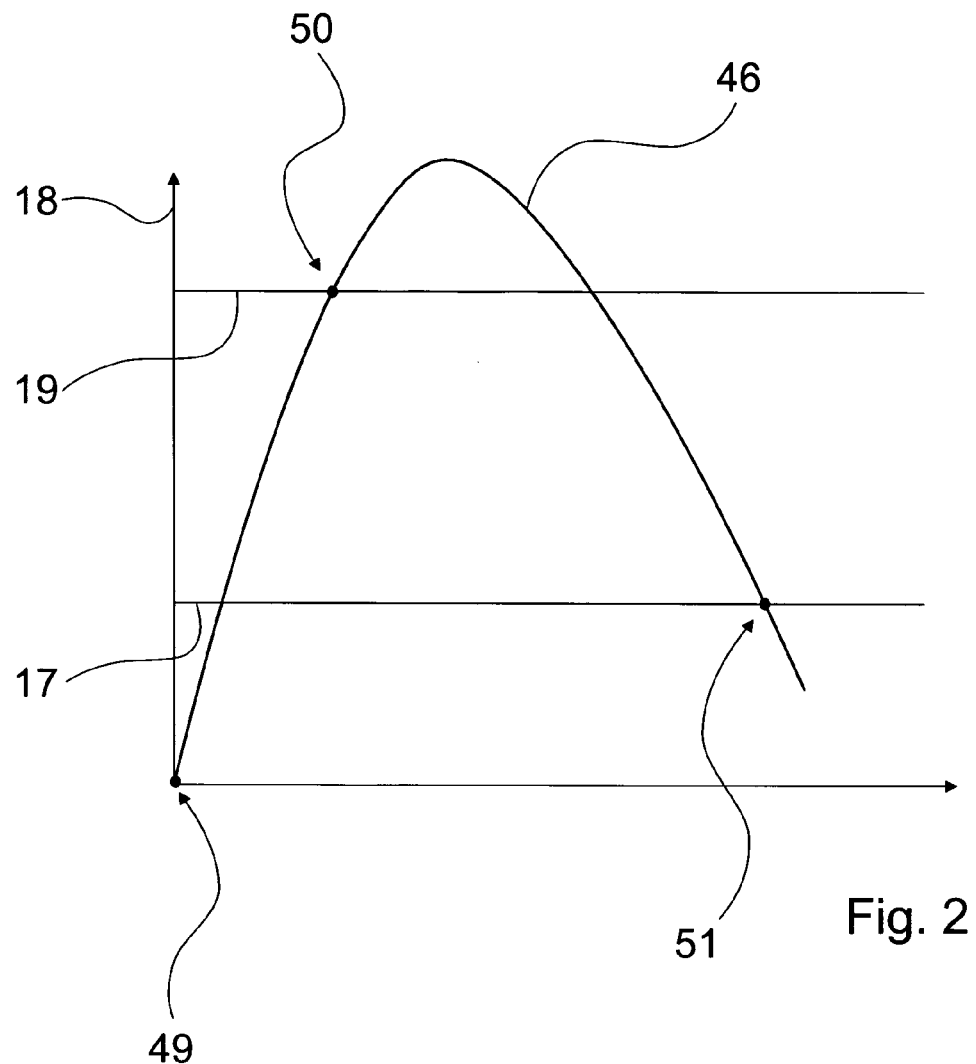

An exemplary progression of a vehicle speed 46 is shown in FIG. 2, which represents a first operating condition 17 and a second operating condition 19. When starting in a point 49, the control unit 16 recognizes a vehicle speed 46 below the first operating condition 17. The first operating condition 17 is fulfilled thereby. As a vehicle speed 46 equal to zero is present, the control unit 16 at this point shifts into the standby operating mode without first synchronizing the axle drive 22 with the drive wheels 30. The control unit 16 subsequently maintains the standby operating mode, until the vehicle speed is larger than the upper limit speed, by which the second operating condition 19 is defined.

Starting from the point 49, the vehicle speed 46 increases. The control unit 16 recognizes a vehicle speed 46 above the upper speed limit at a point 50. The second operating condition 19 is fulfilled thereby, whereby the control unit 16 shifts from the standby operating mode to the normal operating mode at the point 50. The control unit 16 simultaneously opens only the two clutches 23, 24 for this.

Starting from a maximum value of the vehicle speed 46, which can essentially be maintained over a time span with an arbitrary length, the vehicle speed 46 decreases again. The control unit 16 recognizes a vehicle speed 46 below the lower speed limit from a point 51. The first operating condition 17 is fulfilled thereby, whereby the control unit 16 shifts from the normal operating mode into the standby operating mode at the point 51. As a vehicle speed 46 unequal zero is present, the control unit 16 first applies to the actuation chamber a low actuation pressure and thus intermittently closes the first clutch unit 14. The control unit 16 thereby first synchronizes the axle drive 22 of the second drive axle 13 with the drive wheels 30 of the second drive axle 13. After a successful synchronization or after expiration of the maximum duration, the control unit 16 subsequently shifts into the standby operating mode, by first closing the second clutch unit 15, while holding the first clutch unit 14 open by a reduced actuation pressure in the actuation chamber of the first clutch unit 14 by means of the pressure control valve 37.

The control unit 16 adapts the above mentioned upper and lower speed limits according to the traction parameter. For example, the speed limits are increased at slippery road conditions.

If the control unit 16 recognizes a slip between the unpowered axle and the permanently driven first axle 11 during the active standby operating mode, which is larger than the slip limit value, or if the control unit 16 recognizes a necessity for the engageable second drive axle 13 to be engaged, the control unit 16 connects the second drive axle 13 to the first drive axle 11. The control unit 16 only needs to close the first clutch unit 14 for this. A synchronization of the axle drive 22 with the drive wheels 30 is not necessary, since the clutches 23, 24 are already engaged.

The control unit 16 adapts the above mentioned slip limit value according to the traction parameter. For example, the slip limit is lowered at slippery road conditions to allow engagement of the first clutch unit 14 before the slip builds up a high value.

The first clutch unit 14 is engaged with high pressure. Greater the pressure applied to the actuation chamber, the greater will be the torque transmitted to the second drive axle 13, increasing the tractive effort on the vehicle in a similar manner to a locked differential.

Further, in the 6×4 operating mode, the actuation pressure of the first clutch unit is adjusted based on the slip of the first drive axle 11 and the speed difference between the first and second drive axles 11, 13. If the slip continues to increase even after engagement of the first clutch unit 14, the actuation pressure is increased in steps until traction is achieved. When the slip reduces, the actuation pressure is reduced and later the first clutch unit 14 is opened. Higher pressure provides a higher locking torque of the first clutch unit 14.

If the control unit 16 recognizes a slip between the unpowered axle and the permanently driven first drive axle 11 in an activated normal operating mode, which is larger than the slip limit value, or if the control and regulation unit 16 recognizes a necessity of engaging the second drive axle 13, the control unit 16 connects the second drive axle 13 to the first drive axle 11. The control unit 16 first applies pressure pulses to the actuation chamber with a low actuation pressure and thus intermittently closes the first clutch unit 14. The control and regulation unit 16 thereby first synchronizes the axle drive 22 of the second drive axle 13 with the drive wheels 30 of the second drive axle 13. After a successful synchronization or after expiration of the maximum duration, the control and regulation unit 16 subsequently connects the second drive axle 13 to the first drive axle 11 by closing the second clutch unit 15 and increasing the actuation pressure in the actuation chamber of the first clutch unit 14.

For adapting the actuation pressure of the first clutch unit 14 to a temperature in the first clutch unit 14, the control unit 16 additionally has a thermal model. The control unit 16 estimates the temperature of the first clutch unit 14 by means of the thermal model and adapts the actuation pressure to this. With a limit temperature of the first clutch unit 14, the control unit 16 shifts the first clutch unit 14 into the first clutch operating state.

At very low vehicle speeds and at launch, the control unit 16 switches to a pre-emptive 6×4 operation mode. Engaging the first clutch unit 14 under low speed and high engine torque evens out the tire wear at the first and second drive axle 11, 13. This transition to 6×4 operating mode occurs even if the no wheel spin is detected to improve drive tire life on the first drive axle 11.

The control unit 16 additionally monitors an oil temperature of the axle drive 22 of the second drive axle 13 and closes the first clutch unit 14 when the oil temperature is below a temperature threshold. During extended duration of operation in the normal mode and during freezing ambient temperatures, it is possible for a second axle sump oil to transform into a semi-solid state. Subsequent engagement of the second clutches 15 during transition to the standby operation mode might cause a torque spike in the axle drive 22. By closing the first clutch unit periodically drive gearwheel 27 of the second axle drive 22 spins and heats up the sump oil In order to prevent a wheelspin of the drive wheels 26, the control unit 16 further comprises an anti-slip regulation unit 45. The anti-slip regulation unit 45 checks an axle slip between the drive wheels of the unpowered axle and the drive wheels 26 of the first drive axle 11. The control unit 16 further checks a drive wheel slip between the drive wheels 26, 30 of the drive axles 11, 13.

In order to determine an axle slip and a drive wheel slip, the anti-slip regulation unit 45 communicates with a sensor system, not shown in detail, at the drive wheels 26, 30. This sensor system determines a speed of the respective drive wheels. The anti-slip regulation unit 45 forms an average of the speeds of the drive wheels 26, 30, which are driven by the respective drive axle 11, 13 for determining the axle speed.

The anti-slip regulation unit 45 stores a slip limit value for recognizing a slip state. The anti-slip regulation unit 45 continuously compares the determined axle slip and the drive wheel slip with the slip limit value. When the slip limit value is exceeded, the anti-slip regulation unit 45 recognizes a slip state. If the anti-slip regulation unit 45 recognizes a turning or a turnaround of the motor vehicle by a comparison of the determined speeds of the drive wheels 26, 30 of a drive axle 11, 13, the anti-slip regulation unit 45 displaces the slip limit value on the basis of the difference between the drive wheels 26, 30.

The anti-slip regulation unit 45 has an engine control function and a brake control function for regulating the slip. The engine control function reduces a slip which is present, especially the axle slip, by reducing the engine torque. The brake control function reduces the slip which is present, especially a drive wheel slip between the two drive wheels of a drive axle 11, 13 by using brakes or by providing a brake torque.

When a slip occurs on a homogeneous surface of a road, the anti-slip regulation unit 45 activates the engine regulation function. When a slip occurs on a non-homogeneous surface of a road (μ-split conditions), the anti-slip regulation unit 45 activates the brake regulation function.

A drive wheel slip limit value is further deposited in the anti-slip regulation unit 45. The anti-slip regulation unit 45 activates the drive wheel slip limit value with the activation of the brake control function. If the present slip, especially between two drive wheels 26, 30 of a drive axle 11, 13 exceeds the drive wheel slip limit value, the anti-slip regulation unit 45 activates the engine control function in addition to the active brake control function.

In order to avoid overheating of the brakes, an upper and a lower speed limit value are deposited in the anti-slip regulation unit 45. The lower speed limit value corresponds to the first operating condition 17 formed as lower speed limit value and the upper speed limit value to the second operating condition 19 formed as upper speed limit value. Below the lower speed limit value, the anti-slip regulation unit 45 activates either the brake control function or the engine control function when necessary. The anti-slip regulation unit 45 only activates the engine control function above the upper speed limit value when necessary. The speed limit values of the anti-slip regulation unit 45 can essentially be distinguished from the operating conditions 17, 19.

The control unit 16 communicates with the anti-slip regulation unit 45. If the anti-slip regulation unit 45 recognizes a slip state, it transfers this information to the control unit 16, whereupon the control unit 16 connects the second drive axle 13. During activation of the brake control function, or of the engine control function, a slip state is thus present, due to which the control unit 16 closes the clutch units 14, 15.

With an activation of the engine control function by the anti-slip regulation unit 45, the speed of the first drive axle 11 is reduced by the reduction of the engine torque during the activation of the engine control function. The speed of the axle drive 22 is thereby adapted to the speed of the second drive axle 13, which is decoupled at this time. The second drive axle 13 can be connected without problems as soon as the speed difference is sufficiently small. As the anti-slip regulation unit 45 especially activates the engine control function if the normal operating mode is shifted, the control unit 16 initially shifts the first clutch unit 14 and only subsequently the clutches 23, 24 of the clutch unit 15.

The standby operating mode is especially active with an activation of the brake control function by means of the anti-slip regulation unit 45. Only the second clutch unit 15 is closed in the standby operating mode. The anti-slip regulation unit 45 thus regulates especially the momentary slip of the drive wheels 26 of the first drive axle 11 by braking the first drive axle 11. The control unit 16 subsequently connects the second drive axle 13 by closing the first clutch unit 14. It is essentially also conceivable that the anti-slip regulation unit 45 controls the momentary slip of the drive wheels 26 of the first drive axle 11 by braking the first drive axle 11 and of the second drive axle 13 together.

The anti-slip regulation unit 45 deactivates the active anti-slip control function or, respectively, the engine control function when a brake pedal is actuated by the driver. The anti-lock braking control unit 44 thus has a higher priority than the anti-slip regulation unit 45. With an engagement of the anti-lock braking control unit 44, the anti-lock braking control control unit 44 controls the brake torque of the drive wheels 23, 30 respectively individually. The anti-slip regulation unit 45 is deactivated if the driver requests a brake torque which could lead to an engagement of the anti-lock braking control control unit 44. During the engagement of the anti-lock braking control control unit, the control unit 16 opens the first clutch unit 14. The clutch operating state of the second clutch unit is maintained. If no engagement of the anti-lock braking control control unit 44 takes place when the brake torque is requested, the control unit 16 maintains the clutch operating state of the first clutch unit 14 and the clutch operating state of the second clutch unit 15. When a driver requests a braking torque the control unit 16 deactivates any calculation of traction parameters.

The driver can activate engine compression brakes to decelerate the vehicle without using the service brake. The control unit 16 engages the first clutch unit 14 to shift into the 6×4 operating mode when engine compression brakes are activated. Engaging the 6×4 operating mode provides even distribution of the negative torque between the first and the second axle drive 11, 13 to produce even tire wear.

On a negative road grade, activating engine compression brakes can also cause wheel lock-up. In this case, the anti-blocking control unit 44 becomes active and disables engine braking. The control unit 16 keeps the first clutch unit 14 closed when antiblocking control unit 44 is just disabling engine compression braking.

With a change of a transmission gear, an engagement of the transmission control unit 43 takes place. The control unit 16 maintains the clutch operating state of the first clutch unit 14 and the clutch operating state of the second clutch unit 15 during engagement of the transmission control unit 43 or during a change of a transmission gear.

If the vehicle isn't equipped with an anti-slip regulation the control unit 16 limits the engine torque under certain adverse situations. Under slippery situations, the 6×4 operating mode is activated to reduce the amount of slip by transferring torque to the second axle drive 13. In extremely slippery conditions, it is possible that even after engagement of the 6×4 operating mode, wheel slip continues to build up. In these cases, the control unit 16 limits the engine torque by sending a message to the engine control unit 42. That's only possible when the driver is controlling the engine torque which implies other systems are not actively commanding any engine torque control. The limitation of the engine torque is enabled when the first axle drive 11 encounters excessive slip. When the axle slip goes below the above mentioned low threshold, the engine torque is restored to the driver request.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive train control arrangement for a motor vehicle drive train, comprising:
   at least one main drive train;
   a first drive axle connected permanently by means of the main drive train;
   at least one auxiliary drive train and a second drive axle coupleable to the main drive train by means of the auxiliary drive train, said auxiliary drive train having at least a first clutch unit and at least a second clutch unit connected in the power train downstream of the first clutch unit, and a control unit, which is configured such that in at least one operating mode
      the control unit establishes a standby operating mode when a defined operating condition is present, wherein the at least one second clutch unit of the auxiliary drive train is closed and the first clutch unit is open, and
      starting from the standby operating mode, the control unit connects, when needed, the coupleable second drive axle in dependence on at least one parameter by closing the first clutch unit of the auxiliary drive train and establishes a 6×4 operating mode.

2. The drive train control arrangement according to claim 1, wherein the control unit is configured such that, starting from the standby operating mode, the control unit shifts to a normal operating mode when a further operating condition is present, by opening the at least one second clutch unit.

3. The drive train control arrangement according to claim 1, wherein the control unit is configured such that, starting from the normal operating mode, the control unit synchronizes at least one second clutch unit by intermittently closing the first clutch unit for shifting the standby operating mode.

4. The drive train control arrangement according to claim 1, wherein the control unit is configured to prevent a shifting of the clutch units during a defined time span.

5. The drive train control arrangement according to claim 1, wherein the control unit is configured to determine an operating condition for establishing the standby operating mode and an operating condition for shifting to the normal operating mode in dependence on the same parameter.

6. The drive train control arrangement according to claim 5, wherein the motor vehicle drive train has at least one unpowered axle and the control unit is configured to determine the parameter by means of the unpowered axle.

7. The drive train control arrangement according to claim 5, wherein the operating condition for shifting to the standby operating mode and the operating condition for shifting to the normal operating mode are defined by two different speed limit values.

8. The drive train control arrangement according to claim 1, wherein the 6×4 operating mode is established when the vehicle speed is below a third speed limit value.

9. The drive train control arrangement according to claim 1, wherein the control unit is configured to adapt at least one of the conditions for a change of the operation mode to a traction parameter in at least one operating state.

10. The drive train control arrangement according to claim 1, wherein the control unit is configured to monitor an oil temperature of the axle drive of the second drive axle and closes the first clutch unit when the oil temperature is below a temperature threshold.

11. The drive train control arrangement according to claim 1, wherein the control unit is configured to engage the 6×4 operating mode when engine compression brakes are activated.

12. The drive train control arrangement according to claim 1, wherein the control unit is configured to connect a drive shaft of the main drive train to a drive shaft of the auxiliary drive train in at least one operating state by means of the first clutch unit.

13. The drive train control arrangement according to claim 1, wherein the auxiliary drive train has at least one axle drive and the second clutch unit has at least two clutches arranged in the power train behind the axle drive and the control unit is configured to simultaneously open the at least two clutches of the second clutch unit for shifting to the normal operation mode.

14. A method for controlling a motor vehicle drive train, which comprises at least one main drive train, a first drive axle drive-connected permanently by means of the main drive train, at least one auxiliary drive train and a second drive axle coupleable to the main drive train by way of the auxiliary drive train, wherein the auxiliary drive train has at least one first clutch unit and at least one second clutch unit connected downstream in the power train of the first clutch unit by at least the following method steps:
   closing the at least one second clutch unit of the auxiliary drive train when a defined operating condition is present to establish a standby operating mode and,
   starting from the standby operating mode, drive connecting the engageable second drive axle if necessary by closing the at least one clutch unit of the auxiliary drive train when desired in dependence on at least one parameter to establish a 6×4 operating mode.

* * * * *